No. 785,935. PATENTED MAR. 28, 1905.
E. H. COTTRELL.
MACHINERY FOR FOLDING PAPER OR OTHER FABRICS.
APPLICATION FILED JAN. 12, 1904. RENEWED DEC. 30, 1904.

Witnesses:
F. George Barry,
Henry Thieme.

Inventor:
Edgar H. Cottrell
by attorneys
Brown & Seward

No. 785,935. PATENTED MAR. 28, 1905.
E. H. COTTRELL.
MACHINERY FOR FOLDING PAPER OR OTHER FABRICS.
APPLICATION FILED JAN. 12, 1904. RENEWED DEC. 30, 1904.

Witnesses:
F. George Barry,
Henry Thieme

Inventor-
Edgar H. Cottrell
By attorneys
Brown & Seward

No. 785,935. PATENTED MAR. 28, 1905.
E. H. COTTRELL.
MACHINERY FOR FOLDING PAPER OR OTHER FABRICS.
APPLICATION FILED JAN. 12, 1904. RENEWED DEC. 30, 1904.

Witnesses:
F. George Barry.
Henry Thieme.

Inventor:
Edgar H. Cottrell
by attorneys
Brown & Seward

No. 785,935. PATENTED MAR. 28, 1905.
E. H. COTTRELL.
MACHINERY FOR FOLDING PAPER OR OTHER FABRICS.
APPLICATION FILED JAN. 12, 1904. RENEWED DEC. 30, 1904.

No. 785,935. PATENTED MAR. 28, 1905.
E. H. COTTRELL.
MACHINERY FOR FOLDING PAPER OR OTHER FABRICS.
APPLICATION FILED JAN. 12, 1904. RENEWED DEC. 30, 1904.

Witnesses:—
F. George Barry,
Henry Thieme.

Inventor—
Edgar H. Cottrell
by attorneys
Brown & Seward

No. 785,935. Patented March 28, 1905.

UNITED STATES PATENT OFFICE.

EDGAR H. COTTRELL, OF STONINGTON, CONNECTICUT, ASSIGNOR TO C. B. COTTRELL & SONS COMPANY, OF NEW YORK, N. Y., A CORPORATION OF NEW JERSEY.

MACHINERY FOR FOLDING PAPER OR OTHER FABRICS.

SPECIFICATION forming part of Letters Patent No. 785,935, dated March 28, 1905.

Application filed January 12, 1904. Renewed December 30, 1904. Serial No. 238,877.

*To all whom it may concern:*

Be it known that I, EDGAR H. COTTRELL, a citizen of the United States, and a resident of Stonington, in the county of New London and State of Connecticut, have invented a new and useful Improvement in Machinery for Folding Paper or other Fabrics, of which the following is a specification.

A machine embodying this invention is capable of producing signatures of sixty-four pages from printed sheets of the same number of pages, the said sheets being first folded and cut into sixteen-page signatures and a set of sixty-four-page signatures being formed by setting one within another four of said sixteen-page signatures, the four sixteen-page signatures being all obtained from one sheet or two from one sheet and two from another, as may be desired.

The invention consists in certain devices and combinations thereof illustrated by the accompanying drawings and hereinafter described and claimed, whereby the operations necessary for so producing signatures comprising a larger number of pages from signatures consisting of a smaller number of pages are performed; and it further consists in certain provisions hereinafter described and claimed for stapling together a number of signatures of the smaller number of pages to form a permanent one of the larger number.

20 designates the main framing containing the bearings for the driving-shaft 21, cam-shaft 22, lower feed-roll 23, and other shafts and rolls to be hereinafter described, the said feed-roll being arranged at the foot of the feed-table 24, over which the sheets are to be fed or presented to the feed-rolls 23 25 in any suitable manner.

At a proper distance forward of the feed-rolls there are arranged (see Fig. 2) a slotted folding-plate 26, folding-rolls 27 27*, and a folding-blade 28 of well-known construction for producing in the sheet a fold across the center thereof. At a proper distance forward of the plate 26, rolls 27 27*, and blade 28, but somewhat lower than them, are arranged the slotted plate 30, rolls 31 31*, and blade 32 for making a second fold in the sheet parallel with the first one midway between the latter and the edges.

Under the foremost of the folding-rolls 31 31* there is arranged the shaft 36 of the rotary slitter, carrying three slitting-blades 37, only one of which is visible, for cutting the folded sheet transversely to the lines of fold into four quarter-sheets which may be termed "signature-sections." This rotary slitter is of well-known kind and needs no particular description further than to say that its blades 37 run in grooves in the folding-roll 31* above. Forward of the slitter are suitably arranged (see Fig. 4) a folding-table 39, four parallel pairs of folding-rolls, two of which pairs are designated 40 and two 40*, and four folding-blades 41, coöperating with said rolls through slots in said table, the stocks 41* of said folding-blades being all rigidly placed on one bar 43, which is pivoted into the arms 44 of a rock-shaft 45. The said folding-rolls 40

40* and blades 41 are arranged transversely to the rolls 27 27* 31 31* and blades 28 32 for producing folds of the cut quarter-sheets or signature-sections in directions transverse to the two folds of the original sheet and parallel with the direction in which said quarter-sheets had been cut from the original sheet, thereby producing from each quarter-sheet or section a sixteen-page folded signature. For the purpose of preserving a parallel motion of the folding-blades 41 their carrying-bar 43 has affixed upon it an arm 47, which is connected by a radius-bar 48 with a fixed pivot 49 on the machine-framing.

Figure 1:
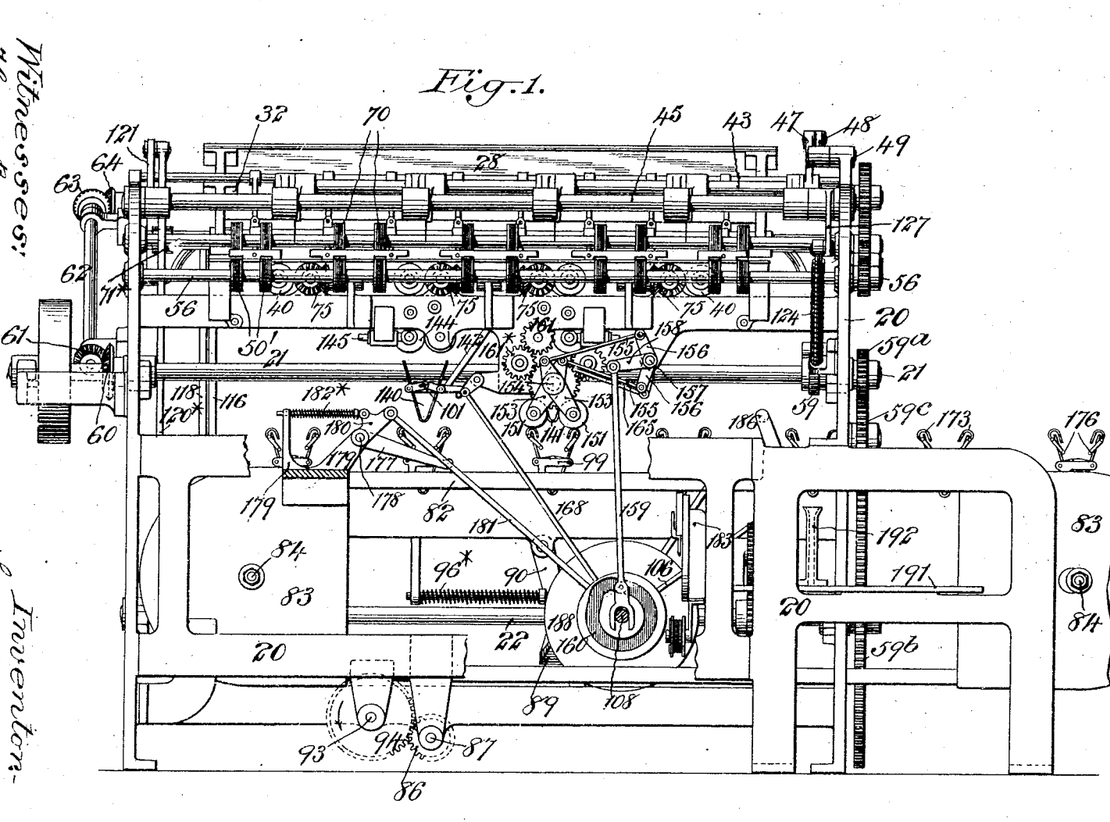
Figure 1 of the drawings represents the delivery end of a machine for making sixty-four-page signatures.
Figures 2, 3:
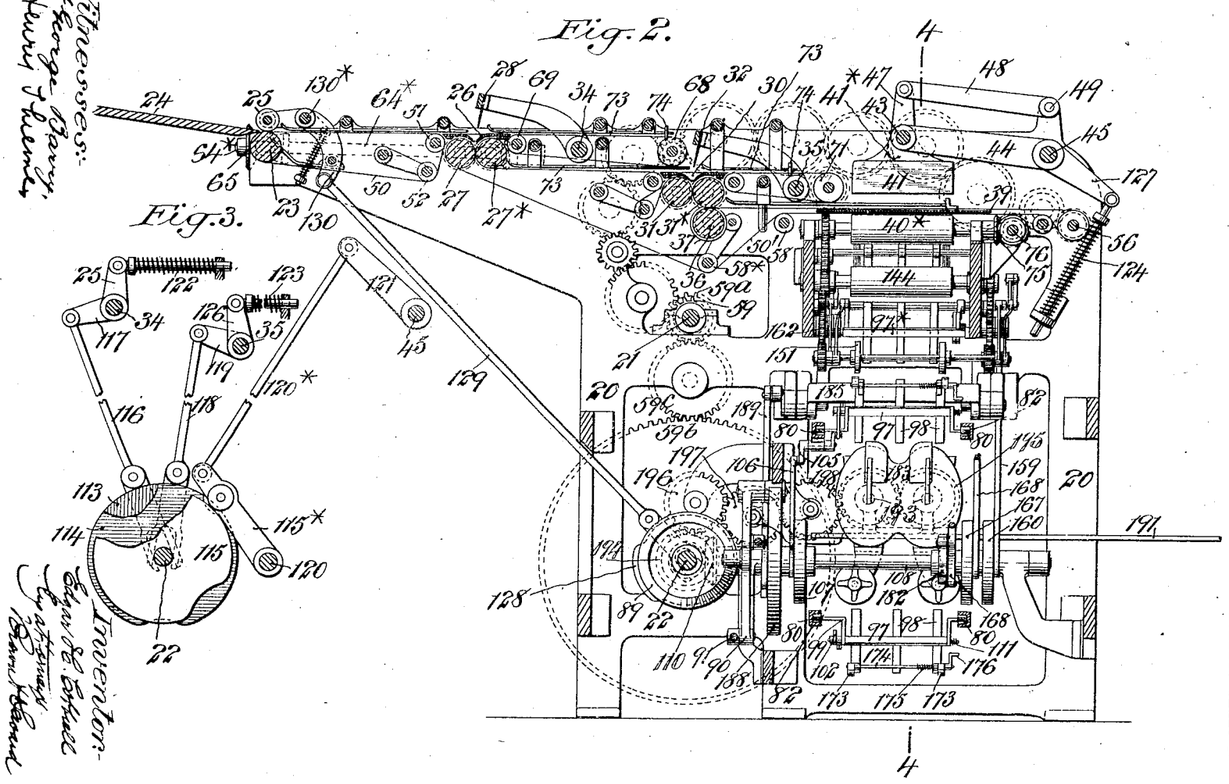
Fig. 2, a vertical longitudinal section at right angles to Fig. 1, taken at about the middle of the width of the machine.
Fig. 3, a vertical sectional view, parallel with Fig. 2, of mechanism for operating the folding-blades.

For the purpose of first carrying the unfolded sheets from the feed-rolls 23 25 to the folding-plate 26, next carrying the once-folded sheets from the folding-rolls 27 27* to the folding-plate 30, and afterward carrying the twice-folded sheets to the slitters 37 and thence to the folding-table 39 there are employed two carriers 50 50', each consisting of a suitable number of cords or tapes. These carriers, though partly visible in Fig. 2, are more clearly represented in the corresponding diagram Fig. 13, wherein their courses are traced by arrows. Commencing at the lower feed-roll 23 the carrier 50 runs therefrom and around idler-pulleys 51 52 to near the first folding-rolls 27 27*. The carrier 50' runs over the folding-roll 27 and under 27*, thence over and under idler-pulleys 53 54, over one and under the other of the second folding-rolls 31 31*, thence over the folding-table 39, returning round pulleys 55 on a rotary shaft 56, thence under the table 39, over idler-pulleys 57 58, under idler-pulleys 58*, and thence to the folding-roll 27. These carriers run continuously in the directions of the arrows shown upon them in Fig. 13 and may be driven in any suitable manner. 50 is represented as driven by the feed-roll 23 and 50' as driven by the folding-rolls 27 27* 31 31* and by the shaft 56, all of which are driven positively by any suitable gearing—such, for example, as is shown in Figs. 1, 2, 4, and 12. A spur-gear 59, Figs. 1, 2, 4, and 12, on said shaft 21 serves, as may be easily traced through Fig. 12, to drive the folding-rolls 31 31* and slitter-shaft 36 and the carrier-shaft 56. A bevel-gear 60, Figs. 1 and 4, on said shaft meshes with a bevel-gear 61 on a side shaft 62, Figs. 1 and 4, another bevel-gear, 63, on which shaft meshes with and drives a bevel-gear 64 on the feed-roll 23. This roll is geared, through another side shaft 64*, Figs. 2 and 12, and the bevel-gears 65 66, with the folding-roll 27* for driving the folding-rolls 27 27*. The folding-rolls 40 40* are represented (see Figs. 1 and 4) as driven by the same train of gearing which includes and begins with the gear 59, the said rolls all being geared by pairs of miter-gears 75, Figs. 1 and 2, with a shaft 76, Figs. 2 and 12, which for driving it is furnished with the gear 77.

Figure 13:
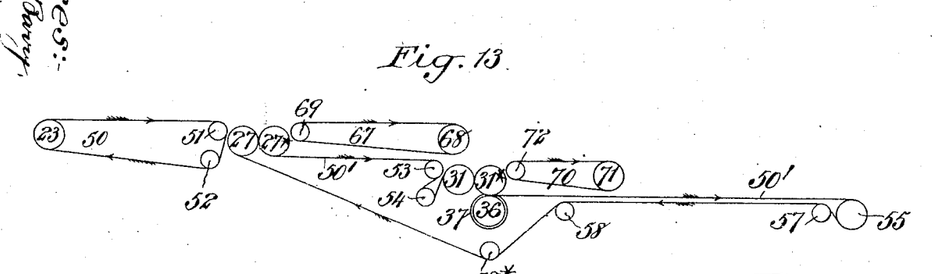
Figs. 13 and 14 are diagrams of carrying-tapes, which will be hereinafter explained.

Forward of the folding-rolls 27 27* there is arranged over the carrier 50', as shown in Figs. 2 and 13, a supplementary carrier consisting of tapes or cords 67 and carrying pulleys 68 69 therefor for the support of the forward parts of the unfolded sheets during their presentation to the said folding-rolls and for the support of said parts during the first part of the first folding operation. Likewise forward of the second folding-rolls 31 31* there is arranged over the said carrier 50' a supplementary carrier consisting of tapes or cords 70 and carrying pulleys 71 72 therefor for the support of the forward parts of the sheets which have been once folded during their presentation to the latter folding-rolls and during the first part of the second folding operation. For driving the supplementary carriers 67 70 the shafts 68* and 71* of their pulleys 68 71 are furnished with gears 67* and 70*, which are included in the train illustrated in Fig. 12, which includes the gear 59. Over the supplementary carriers 67 70 there are arranged stationary guard-rods 73 for preventing the turning up of the forward parts of the sheets on said carriers, and on these rods 73 are stops 74 for stopping the sheets in proper positions for folding by the rolls 27 27* and 31 31*, respectively.

The folding-blades 28 32 41 may be actuated by any suitable means. For actuating them I have represented three cams 113 114 115 on the shaft 22, which receives constant rotary motion, as illustrated in Figs. 1, 2, 4, and 12, through its gear 59$^b$ from a gear 59$^a$ on the driving-shaft 21 and an intermediate loose gear 59$^c$. These cams are shown in Fig. 3, which represents a transverse section of the shaft 22 and side views of the cams. The cams 113 114 for operating the blades 28 32 are both alike. The cam 113 operates, through a rod 116, on an arm 117 of the rock-shaft 34, which carries the blade 28. The cam 114 operates for the purpose, through a rod 118, on the arm 119 of the rock-shaft 35, which carries the blade 32. The cam 115 operates, through a lever 115*, having a fixed fulcrum 120, on a rod 120*, which connects said lever with an arm 121 on the rock-shaft 45, by the arms 44 of which is carried the bar 43, which carries the blades 41. The cams operate to raise the blades; but the downward movements of the blades, by which the foldings are performed, are produced by springs 122 123 124 under the control of said cams, as is common in such folding devices. The spring 122 for producing said movement of the blade 28 is represented in Fig. 3 as applied to an arm 125 of the rock-shaft 34. The spring 123 for producing the movement of the blade 32 is ressented in Fig. 3 as applied to an arm 126 of the rock-shaft 35, and the spring 124 for producing said movement of the blades 41 is represented in Figs. 1 and 2 as applied to an arm 127 of the rock-shaft 45.

The cam-shaft 22 is represented (see Figs. 1, 2, and 4 and also in the detail section Fig. 3) as carrying, besides its other cams above-mentioned, a cam 128 for lifting the feed-roll 25 at proper times, the said cam operating on a yoke-rod 129, connected to the arm 130 of the rock-shaft 130*, which carries the said feed-roll.

Figure 4:
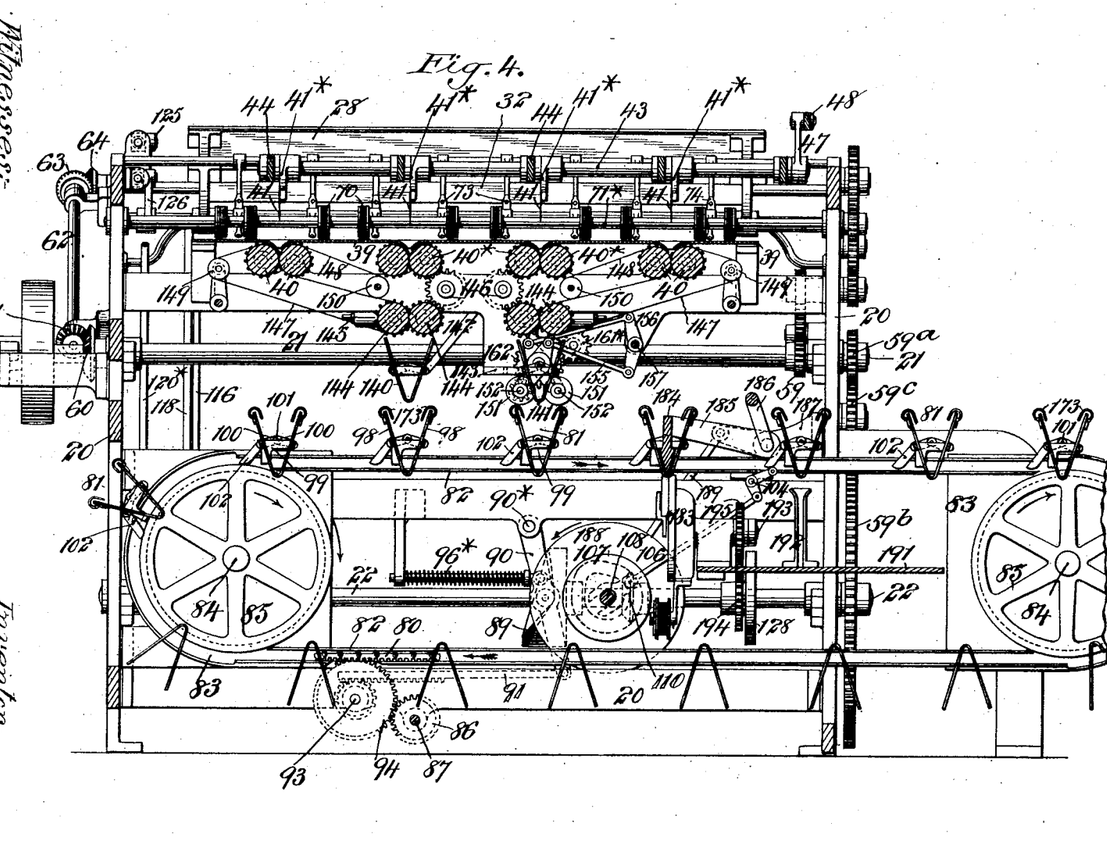
Fig. 4, a vertical section parallel with Fig. 1, taken on the line 4 4 of Fig. 2.
Figures 5, 6, 7, 8, 9, 15:
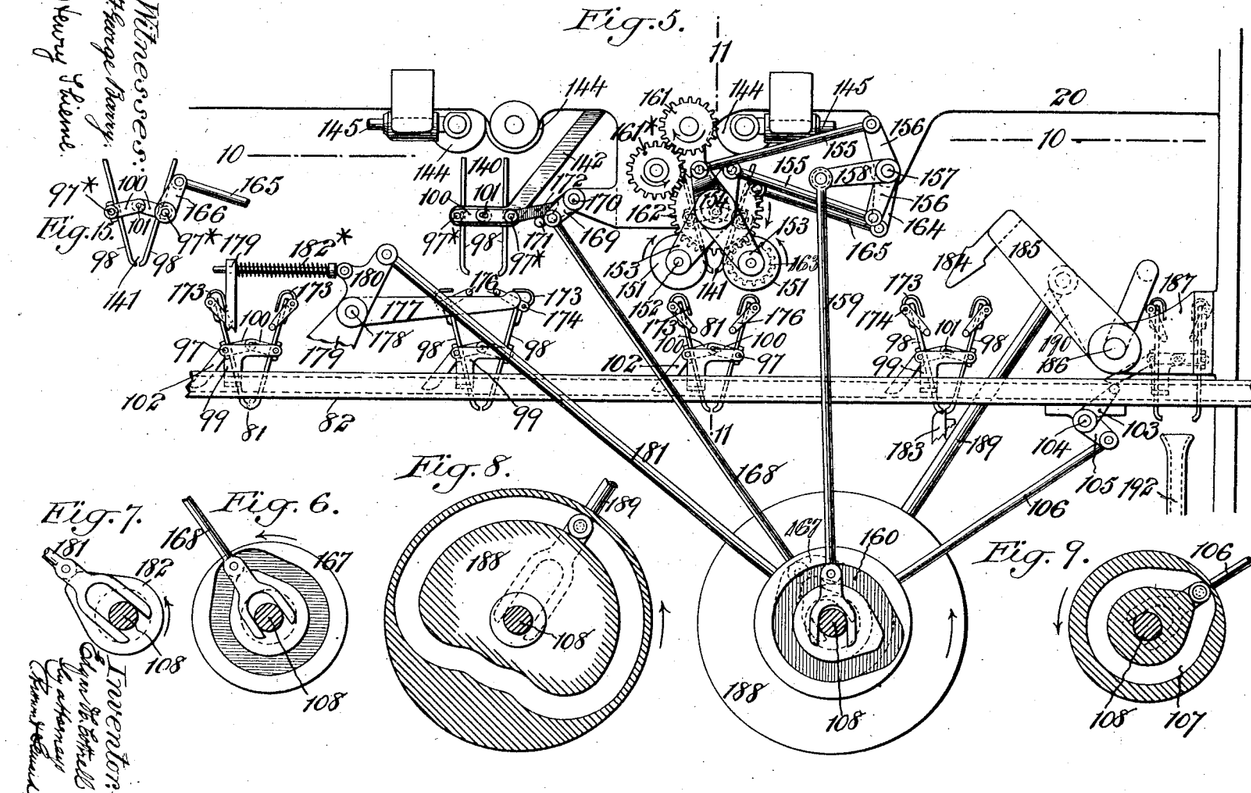
Fig. 5, a view corresponding with portions of Figs. 1 and 4, but on a larger scale, showing the insetting devices and parts of the stapling devices.
Figs. 6, 7, 8, 9, side views of cams the duties and operations of which will be hereinafter explained.
Fig. 15, a detail view, which will be hereinafter explained.

So far as the machine illustrated has been hereinabove described it produces from one sixty-four-page sheet four sixteen-page signatures, and it resembles in all essential particulars a machine which is the subject of my application, Serial No. 181,980, for United States Letters Patent and by which the four sixteen-page signatures to make one sixty-four-page signature are taken each from one of four original sheets. There is also in this machine (see Figs. 1, 4, and 5) arranged below the folding-rolls 40 40* an intermittently-moving endless signature-carrier consisting of two parallel endless toothed racks or chains 80, furnished with pockets 81, running horizontally in a direction transverse to that of the endless sheet-carriers 50 50'; but instead of the sixteen-page signatures passing directly from such folding-rolls to the carrier-pockets 81, as in that machine, they are in this first collected in two's, inset one within another in two intermediate pockets 140 141, Figs. 1, 4, 5, and 10, and the two so inset in one of said intermediate pockets are first deposited in one of the carrier-pockets 81, and then while in the latter pocket they have inset within them the two which had been similarly collected in the other intermediate pocket. The several carrier-pockets 81 are at distances apart equal to the distance between the several pairs of folding-rolls 40 40*. The two intermediate pockets 140 141 are at corresponding distances apart and are arranged, respectively, directly under those two of said pairs of folding-rolls designated 40*, which are next the middle of the width of the machine, and the intermittent movements of the carrier 80 are so provided for and timed that its stoppage or intermissions occur with two of its pockets 81 under the two intermediate pockets 140 141 and the two pairs of folding-rolls 40* last mentioned, as shown in Figs. 1, 4, and 5.

Figure 10:
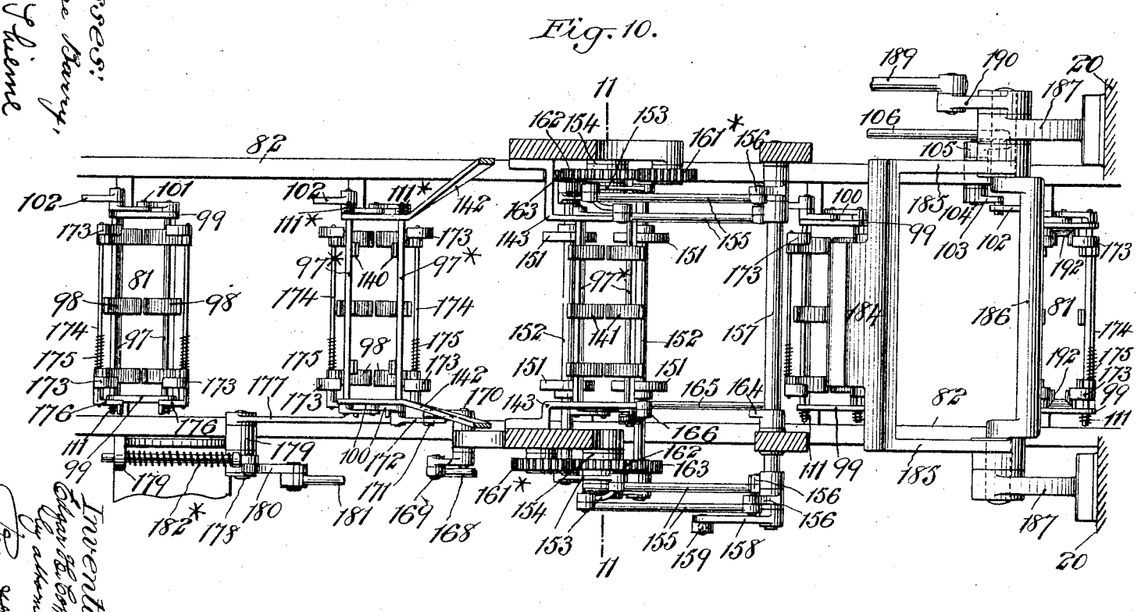
Fig. 10, a horizontal section corresponding with Fig. 5 on the line 10 10 thereof.

The carrier-pockets and the intermediate pockets are of substantially similar construction—that is to say, for the purpose of providing for the closing and opening of their bottoms they are each composed of two similar pivotally-connected skeleton members, each of said members constituting half of the pocket and consisting of a horizontal bar 97 or 97* and side pieces 98, firmly attached thereto, the said bars 97 of the carrier-pockets being pivoted into brackets 99, (see Figs. 1, 2, 4, 5,) which are rigidly attached to opposite links of the endless racks of the signature-carrier, and the said bars 97* of the intermediate pockets being pivoted at suitable fixed points on the machine. The pivots of the bars 97* of the rearward intermediate pocket 140 are represented as in fixed brackets 142, (see Figs. 5 and 10,) carried by the framing of the machine, and the pivots of the bars 97* of the forward intermediate pocket 141 are represented as in brackets 143 on one of the cross-pieces of the framing. The pivot-bars 97 97* of the carrier-pockets and those 97* of the intermediate pocket 140 have applied to them, as shown in Fig. 10, between them and their supporting-brackets springs 111 and 111*, by which they are kept closed at all times except when they are opened by cams, as hereinafter described, for the delivery of the completed signatures; but the intermediate pocket 141 has no such springs, as both its opening and closing have to be effected in a positive manner by a cam. For the purpose of opening and closing the intermediate pockets and of opening the carrier-pockets the two members or halves of each of both the intermediate and the carrier pockets have affixed to one end an arm 100, and these two arms are connected, as shown at 101 in Figs. 1 and 5, by a pin in one entering a slot in the other, so that by a pivotal movement given one member a corresponding movement is imparted to the other. The cam above mentioned for opening and closing the intermediate pocket 141 and cams for opening the carrier-pockets and the intermediate pocket 140 are all on a horizontal shaft 108, which is arranged in fixed bearings at right angles to the cam-shaft 22 and receives constant rotary motion therefrom through a pair of miter-gears 110. (Shown in dotted outline in Figs. 2 and 4.)

Figures 14, 16:
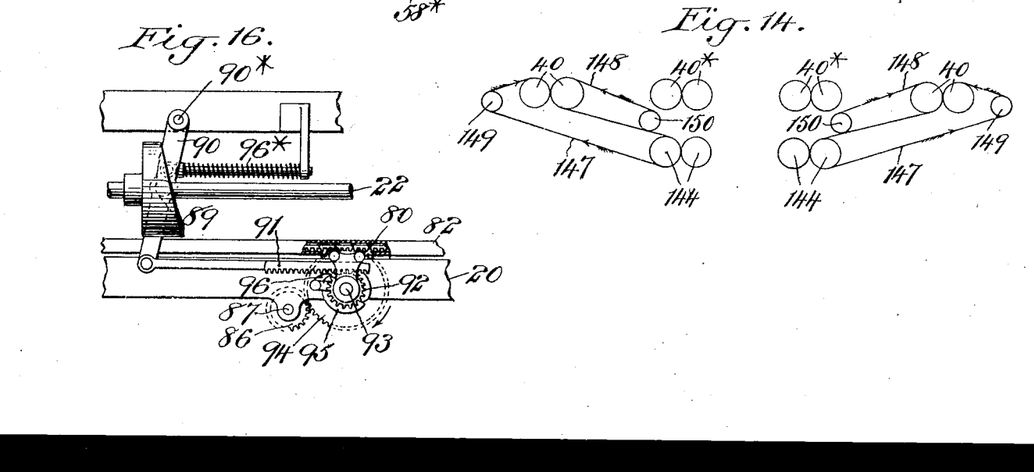
Fig. 16, an elevation of parts shown in Fig. 4, but viewed from the opposite direction.

Between each of the intermediate pockets 140 141 and the pair of folding-rolls 40*, situated above it, there is in stationary bearings a pair of continuously-rotating rolls 144, between which one sixteen-page signature folded by said folding-rolls and another such signature folded by the adjacent pair of folding-rolls 40 to the right or left of it are carried together into one of the carrier-pockets and therein inset one within the other. The bearing for one of these rolls 144 has applied to it an adjusting-screw 145 for the purpose of producing a suitable pressure to close the two signatures together as they enter the pocket. Said rolls are geared together and represented (see 146, Fig. 4) as geared with and driven by one of their respective rolls 40*. For the purpose of carrying each signature folded by one of the pairs of folding-rolls 40 into the signature folded by its adjacent pair 40* and insetting it therein there are employed, as shown in Figs. 4 and 14, two sets of tape carriers 147 and 148, the set 147 running over the outer roll 40, under its corresponding roll 40*, around one of the rolls 144, and around an adjustable tightening-roll 149 and the set 148 running around the inner roll 40 and an idler-roll 150, running in fixed bearings.

Between the signature-carrier and the intermediate pocket which occupies the most advanced position in the direction of the run of said carrier—that is to say, the pocket 141—there are arranged (see Figs. 5, 10, 11) rolls 151, which receive the two signatures from the pocket 141 and inset them together into two signatures which had been previously deposited by the pocket 140 into a pocket of the carrier which has been brought from the position under the pocket 140 to the position under the pocket 141. These rolls 151 serve the purpose of holding closely together the leaves of the signatures from the pocket 141 as the said signatures enter into those from the pocket 140. The said rolls are carried by two shafts 152, which run in bearings in the lower ends of two pairs of crossed levers 153, the fulcrum of which are two fixed studs 154, secured in the framing. The upper ends of said levers are connected by rods 155 with the opposite arms 156 of a rock-shaft 157, which is arranged in fixed bearings in or on the framing and in which there is an arm 158, which is connected by a rod 159 with a cam 160 (see Figs. 2 and 5) on the cam-shaft 108. For the purpose of producing a constant rotation of these rolls 151 in the proper direction the said rolls are geared, as shown in Figs. 1 and 5, with the rolls 144 through gears 161 on said rolls 144, loose gears 161* on the framing, loose gears 162 on said studs 154, and gears 163 on said rolls 151. The same rock-shaft 157 above described also carries an arm 164 for the purpose of opening and closing the pocket 141 at the proper time, as will be understood by referring to Fig. 5 and the detail view Fig. 15 on the same sheet, which represents a side view of the pocket. In these two views it will be seen that said arm 164 is connected by a rod 165 with an arm 166 on the pivot-bar 97* of one half or member of the pocket, and it has been hereinbefore described with reference to all the pockets how by the connection of the two pivot-bars by their arms 100 and the pin 101 the two members of a pocket are caused to move together for opening and closing their bottoms. A cam 167 (see Figs. 2, 5, and 6) on the shaft 108 also serves the purpose of opening the pocket 140 at the proper time, the said cam being connected by a rod 168 with one arm 169 of a rock-shaft 170, which works in fixed bearings in or on the framing and which carries a tappet-arm 171, which (see Fig. 5) strikes under an arm 172, provided on one of the pivot-bars 97* of the pocket.

The carrier-pockets are each furnished at both sides of their mouths (see Figs. 5, 10, 11) with holding devices, represented as bent fingers 173, for the purpose, after the deposit of signatures thereinto from the rearward intermediate pocket 140, of holding open or apart the upper edges of the so-deposited signatures during the deposit thereinto of signatures from the forward intermediate pocket 141. These fingers are attached to small rock-shafts 174, which work in bearings on the backs of the two members of the pocket. To keep these fingers, as shown in Fig. 5, overlapping the edges of the pockets at all times but when each of said pockets is presented under the intermediate pocket 140, coil-springs 175 (see Figs. 10 and 11) are applied between their rock-shaft 174 and the side pieces 98 of the pockets. For the purpose of throwing aside the said fingers, as shown in Fig. 5, in that carrier-pocket which is under the intermediate pocket 140 their rock-shafts 174 are each furnished at one end with an arm 176, the end of which is in range with a lever-arm 177, fast on a rock-shaft 178, which works in fixed bearings in a stand 179 (see Fig. 1) on the machine-framing. This rock-shaft 178 has another arm, 180, which has connected with it a rod 181, which engages with a cam 182 (see Figs. 2 and 7) on the shaft 22. A spring 182* applied between the arm 180 and the stand 179 acts on the said arm to depress the arm 177 to a position in which it is inoperative on the finger-arms 176; but at the proper times for the reception of signatures by a carrier-pocket which is stationary under the intermediate pocket 140 the cam 182 acts to raise the lever-arm 177 and throw back the fingers 173 from the mouth of the carrier-pocket; but after the reception of the signatures by the latter the cam 182 allows the lever-arm 177 to be depressed by the spring 182* and allows the finger-springs 175 to throw the fingers over into the pockets and over the edges of the signatures therein, which are thus held open for the reception of signatures from the pocket 141.

The racks 80 of the intermittently-moving signature-carrier are represented as running in stationary horizontal ways 82, forming parts of frames 83, carried by the main framing, said frames also containing or supporting the pivots 84, on which run the wheels 85, which carry said racks. The two racks are geared together to run in unison by spur-gears 86 and 94, Fig. 4, on shafts 87 and 93, which run in fixed bearings in or on the framing. The movements of the carrier are obtained one from every revolution of a cam 89 on the cam-shaft 22. The means through which the cam 89 drives the carrier-racks are illustrated in Figs. 4 and 16. Said cam acts against a lever 90, which is pendent from a fixed fulcrum 90* and the lower end of which has pivoted to it one end of a rack-bar 91, which engages with a pinion 92, fitted loosely on the shaft 93, hereinbefore mentioned, upon which are the two spur-gears 94, which mesh with the racks. There is also fast on said shaft 93 a ratchet-wheel 95, which is engaged by a pawl 96, carried by the pinion 92, so that by the movement of the rack-bar produced by the cam 89 in one direction the gears 94 produce a movement of the carrier; but during the return movement of the rack-bar, produced by the action of a spring 96* on the lever 90, no movement of the carrier is produced.

Figures 11, 12:
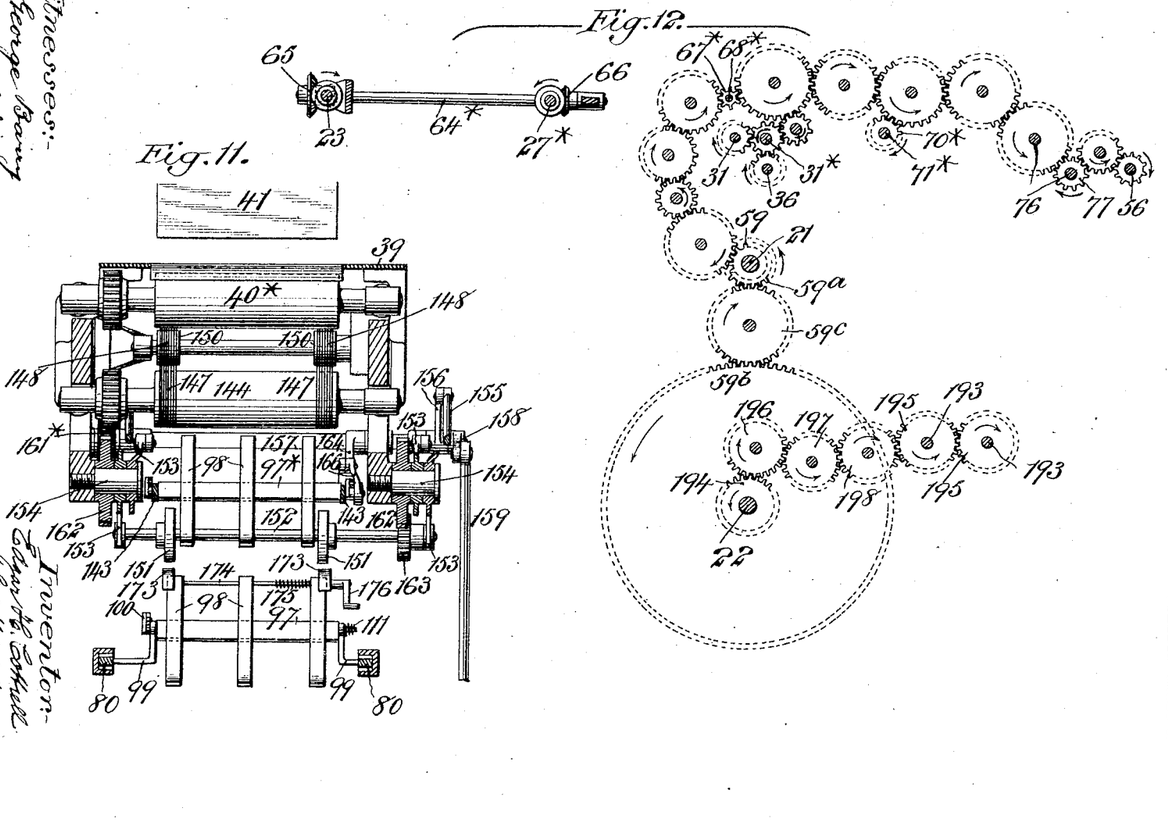
Fig. 11, a transverse vertical sectional view corresponding with Figs. 5 and 10 on the lines 11 11 of Figs. 5 and 10.
Fig. 12, an inside face view of gearing which appears at the right side of Figs. 1 and 4.

For the purpose of stapling together the four sixteen-page signatures forming the sixty-four-page signature which had been collected in the carrier-pocket under the intermediate pocket 141 there is employed a stapler, (designated as a whole by the numerals 183 184 185,) the said stapler occupying such a position relatively to the signature-carrier, as shown in Figs. 4, 5, and 10, that the so-collected signature will be brought to it by the next movement of the carrier. This stapler may be of any suitable kind; but I prefer to use and have represented one substantially like that which is the subject of United States Letters Patent No. 613,210, which is well known, and I have inverted its parts from the position shown in that patent—that is to say, I place the parts 183, which contain and carry those parts which form and drive the staples, under the operative run of the carrier and place the anvil or clenching member 184 above, and instead of making said member 184 stationary I attach it by arms 185 to a rock-shaft 186, which works in fixed bearings in brackets 187 on the framing and provides for dropping it into the pocket, as shown in Fig. 4, at the time for stapling and lifting it out again and holding it up high enough to permit the movement of the carrier and pockets at other times. This movement of the anvil is effected by a cam 188, Figs. 1, 2, 4, 5, and 8, on the shaft 108, the said cam operating through a rod 189, connected with an arm 190 on the rock-shaft 186. The stapler thus arranged inserts the staples from the outside of the fold of the signature and clenches them on the inside of the fold. As this stapler, except its inversion and its movable anvil, above described, constitutes no part of the present invention, no further description of it is necessary; but as it is to some extent represented in the drawings I will, to avoid confusion of its parts with other parts of my machine, mention that its rotary shafts 193 are driven, as shown in Figs. 2 and 12, by a gear 194 on the rotary cam-shaft 22, gears 195 on said rotary shafts, and intermediate gears 196 197 198.

At a distance beyond the stapler equal to the length of the movements of the carrier there is a packer or receptacle of any suitable kind for the completed and stapled signatures; but as that constitutes no part of the present invention only a packing-table 191 and guides 192, erected thereon, for the reception of signatures are represented in the drawings. For the purpose of opening each carrier-pocket after its arrival in proper relation to said packer or receptacle one of the pivot-bars 97 of each of said pockets has affixed to it a rearwardly-projecting arm 102, which by the movement of the carrier is brought, as shown in Figs. 4 and 5, over a roller on the end of the arm 103 of a short rock-shaft 104, which is arranged in a fixed bearing in or on the framing and which has also another arm, 105, which has connected with it a rod 106, actuated by a cam 107 on the shaft 108.

Having now described the several parts which constitute my invention, and their mutual relation, I will now briefly recapitulate their operation in regular succession in folding the sheets and cutting them into sixteen-page signatures and the collection of these signatures into sixty-four-page signatures.

I have mentioned in the introductory part of this specification that a machine embodying the present invention is capable of producing the sixty-four-page signatures from four sixteens all made out of one sixty-four-page sheet or from two sixteens made out of one such sheet and two out of another. This change of operation is effected by simply shifting the cam 160 from one to another of two positions relatively to the cam 167 on the shaft 108. I will first describe the operation in which the sixteens are all taken from one sheet, the said cam 160 being represented in the drawings as set in position for that operation—that is to say, in rear of 167 in the direction of the rotation of the shaft 108, which is indicated in the several figures by arrows.

The sixty-four-page sheets being successively fed by the rolls 23 25 are carried singly to the folder 27 27* 28, and each, after having been thereby folded transversely to its line of travel, passes on to the folder 31 31* 32, whereby it is folded the second time parallel with the first fold. The twice-folded sheet passes thence over the slitter 37 to be cut transversely into four sections, which, passing to and through the folder 40 40* 41, are folded into a set of four sixteen-page signatures, two of which signatures, folded, respectively, by the two pairs of rollers 40*, are received by the rolls 144 and deposited one in the intermediate pocket 140 and the other in the intermediate pocket 141, the other two, folded by the rolls 40, being taken by the carriers 147 and 148 to the rolls 144 and dropped by the latter rolls one into each of the signatures which had been previously deposited in said pockets 140 141, two sixteen-page signatures inset one within the other being thus collected in each of the pockets 140 141. The pocket 140 is opened by its cam 167 before that 141 is opened by its cam 160, and the two signatures from the pocket 140 are therefore deposited in a pocket 81 of the carrier 80 before the pocket 141 is opened to deliver its two signatures, the latter opening not taking place until after a movement of the carrier has been made and the two signatures delivered, as above described, into the carrier-pocket from the pocket 140 have been brought by said movement under that 141. The two signatures delivered from 141 are thus inset into the two previously delivered from 140, thereby making a sixty-four-page signature, which, passing on to the stapler, is completed by the operation of the latter. In these operations of the carrier and pockets every movement of the signature-carrier brings one of its pockets 81 under the pocket 140 to receive two sixteen-page signatures therefrom, and the next movement brings these two signatures under the pocket 141 to receive therefrom two other similar signatures. Every movement of the carrier delivers a completed sixty-four-page signature.

When it is desired to make the four sixteen-page signatures for one sixty-four-page signature, two out of one and two out of another of two sixty-four-page sheets which are fed successively to the folders 27 27* and 31 31* and 40 40, 40* 40*, the only change necessary in the machine is to place and set the cam 160 in such position relatively to that 167 that both cams operate together to open the two intermediate pockets 140 141 simultaneously. Then every time the carrier stops and the said pockets open each of said pockets delivers two signatures to the pocket of the carrier beneath it, and every two signatures delivered from the pocket 141 are inset into the two previously delivered into a carrier-pocket from the pocket 140. In this case every two signatures inserted into and first delivered by the pocket 140 come from one of two sixty-four-page sheets fed to the machine, and every two inserted into the pocket 141 and afterward delivered therefrom into the two from the pocket 140 come from the next succeeding sheet, the two signatures from one sheet deposited in the pocket 140 being delivered into an empty carrier-pocket, which after receiving them is by the next movement of the carrier presented under the pocket 141 to receive two more signatures from the succeeding sheet from the latter pocket, thereby completing the sixty-four-page signature.

What I claim as my invention is—

1. In a folding-machine, the combination of folding mechanism for separately forming signatures, means for collecting the so-formed signatures in twos one inset within the other and means for insetting one of the said collected twos into the other of said collected twos.

2. In a folding-machine, the combination of a carrier, folding mechanism for forming signatures, pockets between said folding mechanism and carrier for the reception of signatures from said folding mechanism, and means for opening the bottoms of said pockets for the delivery of said signatures to the carrier.

3. In a folding-machine, the combination of a carrier comprising pockets for signatures, folding mechanism for forming signatures, intermediate pockets between said folding mechanism and said carrier for the reception of signatures from said folding mechanism, and means for opening the bottoms of said pockets for the delivery of said signatures to the pockets of the carrier.

4. In a folding-machine, the combination of folding mechanism for separately forming signatures, a carrier, pockets between said folding mechanism and carrier, means for collecting the separately-formed signatures and insetting one within another in said pockets, and means for opening the bottoms of said pockets for delivering the so-inset collections from said pockets inset one within another to the carrier.

5. In a folding-machine, the combination of folding mechanism for separately forming signatures, a carrier comprising pockets, intermediate pockets between said folding mechanism and carrier, means for collecting the separately-formed signatures and insetting one within another in said intermediate pockets, and means for delivering the so-inset collections from the intermediate pockets and insetting one within another in the carrier-pockets.

6. In a folding-machine, the combination of a carrier comprising pockets, folding mechanism for separately forming signatures of smaller numbers of pages, two intermediate pockets between said folding mechanism and said carrier for receiving from said folding mechanism a plurality of such separately-formed signatures inset one within another, and means for first delivering into a carrier-pocket the so-inset signatures from one intermediate pocket and afterward delivering the so-inset signatures from the other intermediate pocket into the same carrier-pocket inset within those first delivered thereinto, thereby obtaining in one carrier-pocket a signature consisting of duplicated pluralities of such signatures of the smaller number of pages.

7. In a folding-machine, the combination of mechanism for separately forming four signatures, a carrier comprising pockets, two intermediate pockets between said mechanism and said carrier, means between said mechanism and said intermediate pockets for depositing two of said separately-formed signatures one after another inset in each of said pockets, and means for first delivering into a carrier-pocket the two so-inset signatures from one intermediate pocket and afterward delivering the two so-inset signatures from the other intermediate pocket into the same carrier-pocket thereby forming in said carrier-pocket a signature of sixty-four pages.

8. In a folding-machine, the combination of a folding mechanism for forming signatures, a carrier, a pocket between said mechanism and carrier, and means for producing both the closing of said pocket for the reception of signatures from the folding mechanism and the opening of said pocket for the delivery of said folded sheets to the carrier.

9. In a folding-machine, the combination of folding mechanism for forming signatures, a carrier, a pocket between said mechanism and carrier, a spring for closing the bottom of said pocket for the reception of signatures from the folding mechanism and cam-actuated mechanism for opening the bottom of said pocket for the delivery of the signatures to the carrier.

10. In a folding-machine, the combination of mechanism for forming signatures, a carrier comprising pockets, an intermediate pocket between said mechanism and the carrier for the reception of signatures from said mechanism, means for opening and closing said intermediate pocket, and rolls between said intermediate pocket and the carrier for closing the leaves of the signatures as they pass from the open intermediate pocket to a carrier-pocket.

11. In a folding-machine, the combination of a carrier comprising pockets, folding mechanism for separately forming signatures, two intermediate pockets between said mechanism and carrier, means located between said mechanism and said intermediate pockets for depositing two of said separately-formed signatures one after another inset one within the other in each of said pockets, means for first delivering into a carrier-pocket the two so-inset signatures from one intermediate pocket and afterward delivering the two so-inset signatures from the other intermediate pocket into the same carrier-pocket, and rolls between the last-mentioned intermediate pocket and the carrier-pocket for holding together the leaves of the signatures passing from the last-mentioned intermediate pocket into those previously delivered into the carrier.

12. In a folding-machine, the combination of signature-folding mechanism, a signature-carrier, stationary pockets having opening and closing bottoms between said folding mechanism and carrier, and rolls between said folding mechanism and pockets for transferring folded signatures from the folding mechanism to said stationary pockets.

13. In a folding-machine, the combination of mechanism for forming signatures, a carrier comprising pockets, an intermediate pocket having an opening and closing bottom between said mechanism and the carrier, rolls between said pocket and the carrier for closing the leaves of the signatures as they pass from the open intermediate pocket to a carrier-pocket, crossed levers carrying said rolls, and cam-actuated mechanism for actuating said levers to draw together and spread apart said rolls.

14. In a folding-machine, the combination of a carrier and attached pockets for the reception in each of a plurality of signatures one after another, holding devices pivoted to the sides of said pocket for holding the edges of signatures therein and means for throwing said devices aside from the pocket preparatory to the reception of a signature and of returning them over the edges of the pocket and the edges of the signature therein before the insertion thereinto of another signature.

15. In a folding-machine, the combination of folding mechanism for separately forming signatures, a carrier furnished with pockets, a stationary pocket having an opening bottom and arranged between said mechanism and carrier for the reception of folded signatures, means for giving said carrier an intermittent movement whereby its pockets are presented successively under said stationary pocket, and means for opening the bottom of said stationary pocket while a carrier-pocket is so presented.

16. In a folding-machine, the combination of folding mechanism for separately forming signatures, a carrier furnished with pockets, stationary pockets having opening bottoms and arranged between said mechanism and carrier for the reception of folded signatures, means for giving said carrier an intermittent movement whereby a certain number of its pockets are brought together one under each of said stationary pockets, and means for opening the bottoms of the stationary pockets while the carrier is so under them.

17. In a folding-machine, the combination of folding mechanism for separately forming signatures, a carrier furnished with pockets, stationary pockets having opening bottoms and arranged between said mechanism and carrier, means for collecting from said folding mechanism two pluralities of signatures with those of one plurality inset within those of the other and depositing said two pluralities one in each stationary pocket, means for giving said carrier an intermittent movement whereby two of its pockets are brought together stationary under said two stationary pockets, and means for opening the bottoms of said stationary pockets while the carrier is so stationary for the delivery of the plurality from one stationary-pocket inset into the plurality from the other.

18. In a folding-machine, the combination of folding mechanism for separately forming signatures, a carrier comprising pockets, means for collecting a plurality of so-formed signatures inset one within another and depositing them so inset in the carrier-pockets, and a stapler adapted for stapling together a collected plurality of signatures while in a carrier-pocket which is presented to said stapler.

19. In a folding-machine, the combination of folding mechanism for separately forming signatures, a carrier comprising pockets, means for collecting a plurality of so-formed signatures inset one within another and depositing them so inset in the carrier-pockets, a stapler whose clenching member is adapted to enter the carrier-pockets, and means for placing and holding said member in the pockets for clenching and withdrawing it therefrom to permit the movements of the carrier.

In testimony that I claim the foregoing as my invention I have signed my name, in presence of two witnesses, this 6th day of January, 1904.

EDGAR H. COTTRELL.

Witnesses:
 FREDK. HAYNES,
 HENRY THIEME.